(12) United States Patent
McCartney et al.

(10) Patent No.: US 8,473,568 B2
(45) Date of Patent: Jun. 25, 2013

(54) METHODS AND SYSTEMS FOR PROCESSING MEDIA CONTENT

(75) Inventors: Jason McCartney, Redmond, WA (US); Keith M. Toussaint, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 3017 days.

(21) Appl. No.: 09/817,808

(22) Filed: Mar. 26, 2001

(65) Prior Publication Data

US 2002/0178276 A1    Nov. 28, 2002

(51) Int. Cl.
*G06F 15/16*       (2006.01)

(52) U.S. Cl.
USPC ........... 709/217; 709/203; 709/206; 709/218; 709/228; 382/100; 707/205; 707/10; 707/104.1

(58) Field of Classification Search
USPC ............................................ 709/217; 707/10
See application file for complete search history.

(56) References Cited

U.S. PATENT DOCUMENTS

| | | | |
|---|---|---|---|
| 6,345,256 B1 * | 2/2002 | Milsted et al. | 705/1 |
| 6,505,160 B1 * | 1/2003 | Levy et al. | 704/270 |
| 6,549,922 B1 * | 4/2003 | Srivastava et al. | 707/205 |
| 6,553,379 B1 * | 4/2003 | Jaeger et al. | 707/10 |
| 6,564,219 B1 * | 5/2003 | Lee et al. | 707/100 |
| 6,704,748 B1 * | 3/2004 | Suganuma | 707/104.1 |
| 6,959,416 B2 * | 10/2005 | Manning et al. | 715/513 |
| 2001/0031066 A1 * | 10/2001 | Meyer et al. | 382/100 |
| 2002/0103920 A1 | 8/2002 | Berkun et al. | |

OTHER PUBLICATIONS

Hu et al, "Multimedia Description Framework (MDF) for Content Description of Audio/Video Documents," Proceedings of the Fourth ACM Conference on Digital Libraries, Feb. 1999, pp. 20 pgs.

* cited by examiner

*Primary Examiner* — Kyung H Shin
(74) *Attorney, Agent, or Firm* — Lee & Hayes, PLLC

(57) ABSTRACT

Methods and systems are described that greatly enhance a user's experience when playing various media (e.g. CDs and DVDs). One or more databases, managed by a server, maintain metadata associated with various media. Through inventive mapping techniques, physical IDs that are associated with a user's specific media are mapped to logical IDs. The logical IDs then serve as the basis for database queries that retrieve the metadata. The retrieved metadata can then be sent to a client computer and displayed for the user. In one embodiment, a set of extensible markup language (XML) schema are provided for data exchange between client and server. Additional embodiments allow users to immediately contribute to the set of understood ID mappings. Further, a Wizard is provided and can be used to assist in mapping physical IDs to logical IDs.

9 Claims, 16 Drawing Sheets

Search for Artist

Enter the name of the artist for your CD and click Next keith j

☐ Compilation or Soundtrack

[ < Back ]  [ Next> ]    [ Cancel ]

Choose Artist

Below is a list of artists that provide the closest match.
If you don't see the artist, please click Back to search for a different name, or click Not Found to add it to the database Keith Jackson
Keith Jarrett
Keith Javors
Keith Johnson

[ Not Found ]  [ <Back ]  [ Next> ]  [ Cancel ]

Choose Album

Choose the disc title for this artist, then click Next.
If you do not see the correct title, choose Not Found

- Book of Ways
- Bop-Be
- Bridge of Light
- Byablue
- Changeless
- Changes
- Concerts
- Dark Intervals
- Death and the Flower

[Not Found] [< Back] [Next >] [Cancel]

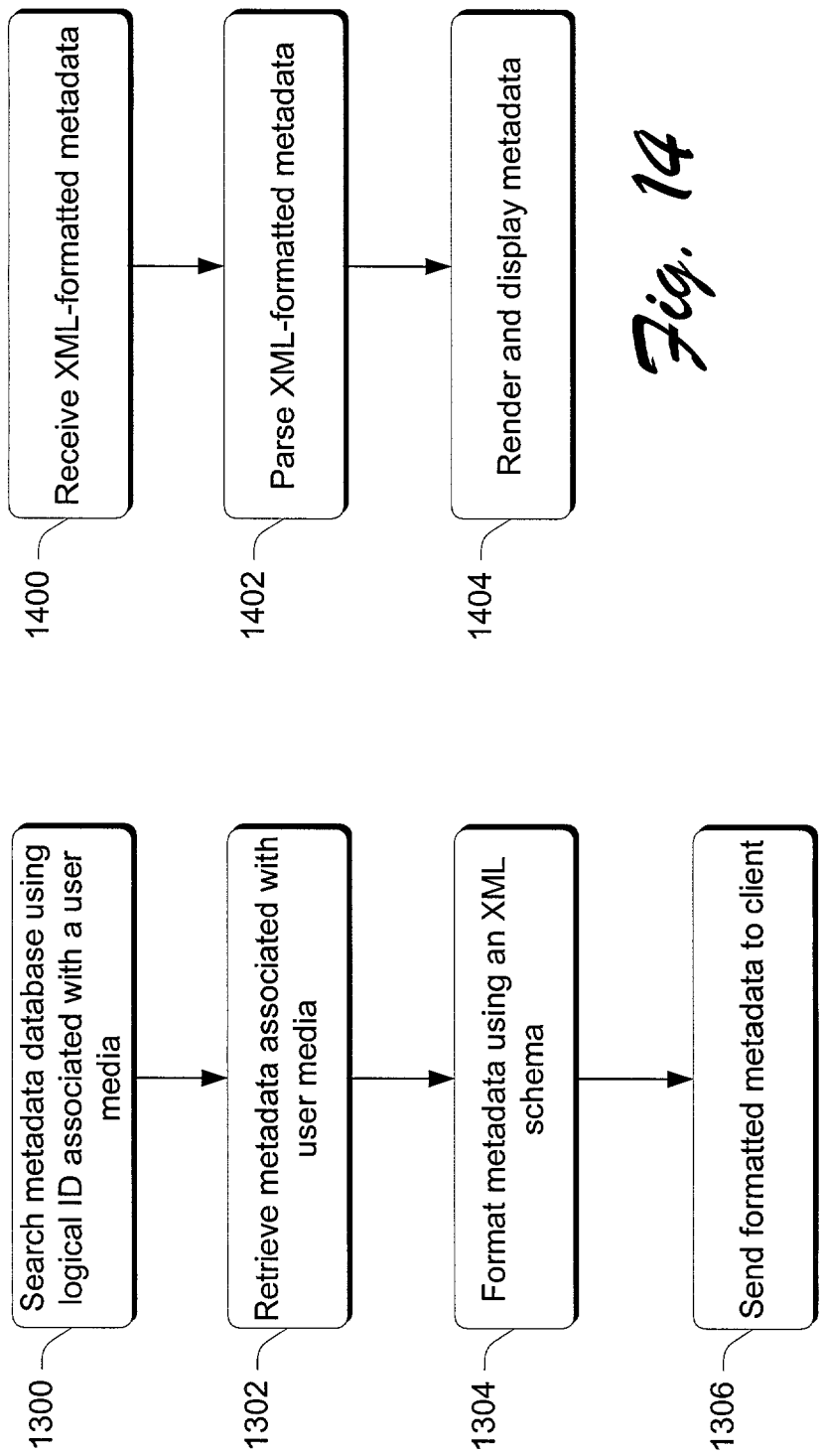

METHODS AND SYSTEMS FOR PROCESSING MEDIA CONTENT

TECHNICAL FIELD

This invention relates to methods and systems for processing media content.

BACKGROUND

With the technological advance of computers and the software that runs on computers, users are now able to enjoy many features which, just a few years ago, did not exist. For example, users can now play various media and multimedia content on their personal or laptop computers, thus providing an improved user experience. For example, most computers today are able to play compact discs (CDs) so that a user can listen to a favorite artist or artists while working on their computer. Additionally, many computers are equipped with a digital versatile disc (DVD) drive so that the user can watch movies on their personal computer.

As users become more used to advanced features on their computers, such as those mentioned above, their expectations of the various additional innovative features will undoubtedly continue to grow. For example, consider a media player software application that enables a user to play a CD on their computer. Typical applications allow a user to display, via the use of a mouse, the track information that is associated with the CD by clicking on an appropriate user interface (UI). Such track information typically includes track numbers, song titles, and playing times. As consumers become more sophisticated, however, this paradigm is going to be perceived as inadequate.

Accordingly, this invention arose out of concerns associated with providing improved systems and methods for processing media content that provide an improved, rich and robust user experience.

SUMMARY

Methods and systems are described that greatly enhance the user experience when playing various media such as CDs and DVDs. One or more databases, managed by a server, maintain metadata associated with various media. The metadata can include any type of additional information that can be of interest to a user or consumer of the media. Through inventive mapping techniques, physical IDs that are associated with a user's specific media are mapped to logical IDs. The logical IDs then serve as the basis for database queries that retrieve the metadata. The retrieved metadata can then be sent to a client computer and displayed for or otherwise consumed by the user. In one embodiment, a set of extensible markup language (XML) schema are provided for data exchange between the client and the server.

Various embodiments also provide an opportunity for user feedback to be immediately incorporated into a server so that it can be used to provide an enriched user experience for others. Specifically, users can provide their own physical ID to logical ID mappings which then become available for use in retrieving the metadata. Security measures can also provide an added degree of security to ensure that the user-provided data can be trusted.

Other embodiments provide a Wizard user interface (UI) that can be used to assist in mapping physical IDs to logical IDs. Specifically, in the event that a logical ID is not initially located for a corresponding physical ID associated with the user's media, the Wizard can guide the user through an information collection process directed to identifying the user's specific media. This is done by collecting information from the user pertaining to their specific media, and searching for matches for the media. This discovery process can be iterative in nature and can result in multiple exchanges between the user and the Wizard. If the Wizard is successful in identifying a user's specific media, then a physical ID to logical ID mapping is created for that media. This mapping can then be used as the basis for metadata database queries. The Wizard can also enable a user to create a physical ID to logical ID mapping for their media in the event that it is unable to identify the user's media.

BRIEF DESCRIPTION OF THE DRAWINGS

FIGS. 8-12 illustrate an exemplary user interface (UI) that is provided by a Wizard in accordance with one embodiment.

FIG. 13 is a flow diagram that illustrates steps in a method in accordance with one embodiment.

FIG. 14 is a flow diagram that illustrates steps in a method in accordance with one embodiment.

DETAILED DESCRIPTION

Overview

The embodiments described below provide methods and systems that enable a user or, more accurately, an enabled media player that is executing on a computing device or client, to access, retrieve, and display for a user, so-called metadata that is associated with specific media content that is being played on the media player. This is done by matching the metadata to the specific media content that is being experienced by a user, and returning the metadata to the user's computing device. In the examples that are given below, the media content is described in the context of content that is embodied on a CD or a DVD. It is to be appreciated and understood that the media content can be embodied on any suitable media, and that the specific examples described herein are given for purposes that include assisting the reader in understanding the inventive principles. For example, the media content can include specially encoded media content in the form of, for example, an encoded media file. An example of such specially encoded media content can include, without limitation, media content encoded in Windows Media format using the Windows Media Player.

Various features of the described systems and methods include a set of databases, client side executable code, and a series of server side processes that provide for querying and maintaining the databases. One logical organization of an exemplary system includes the following: (1) a process to map a piece of physical media to a unique database key or, as referred to herein, a "logical ID", (2) a query process to retrieve information from a database based on the unique database key or logical ID, (3) a data return mechanism and schema set that is used to return data, (4) a user feedback system that allows users to contribute to the set of understood keys or logical IDs, and, (5) a set of management processes that process user contributions, ensure the integrity of the contributions and make the contributions available to the rest of the process.

The resultant system provides a user with the ability to place a CD or DVD into an enabled media playing device (e.g. a computer running Microsoft Windows and Windows Media Player) and expect not only to experience the media contained on the disc, but also have access to all manner of related metadata (e.g. cover art, performer biographies, reviews, related performers, where to buy similar items, upcoming concerts, ticket sales, URLs to other related experiences including buying experiences, and the like). In addition, the user community has the ability to contribute key information to the process to improve the experience for other users.

Figure 1:
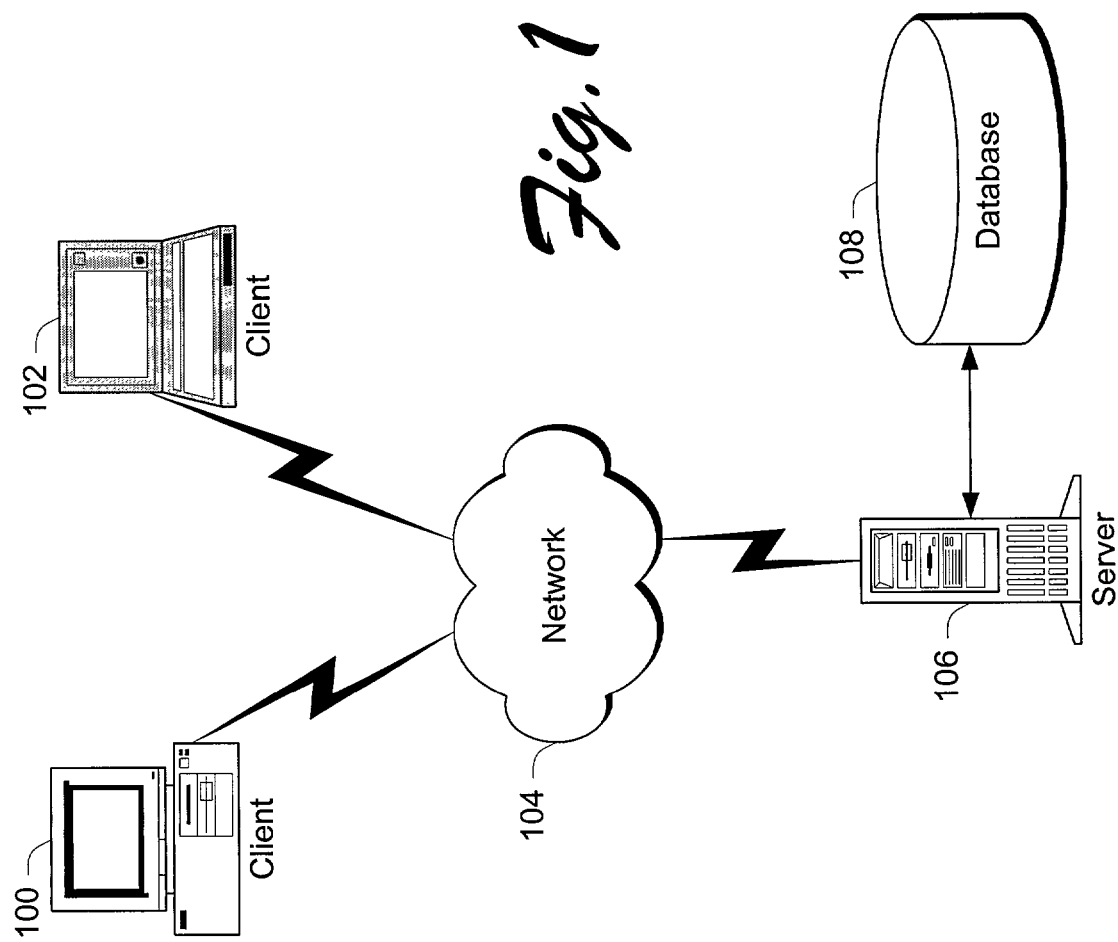
FIG. 1 is a diagram that illustrates an exemplary system in which various embodiments can be implemented.

FIG. 1 shows an exemplary system in which the embodiments described below can be implemented. The system includes one or more client computers—here 100, 102, a network 104, one or more server computers 106, and one or more databases 108. An exemplary network comprises the Internet, although any suitable network can be used.

In this system, a user on the client side inserts their media into their computer, or otherwise causes the content on the media to be experienced. The media is identified by a physical ID that is used to access a logical ID that uniquely identifies the media. The logical ID is then used as the basis for metadata queries of database 108. These queries are designed to retrieve a rich set of related metadata for the user. The metadata is then returned to the client via network 104 and displayed for the user.

The description below will provide detailed aspects of the above systems and various methods that all contribute to a much richer user experience.

Exemplary Computer System

Figure 2:
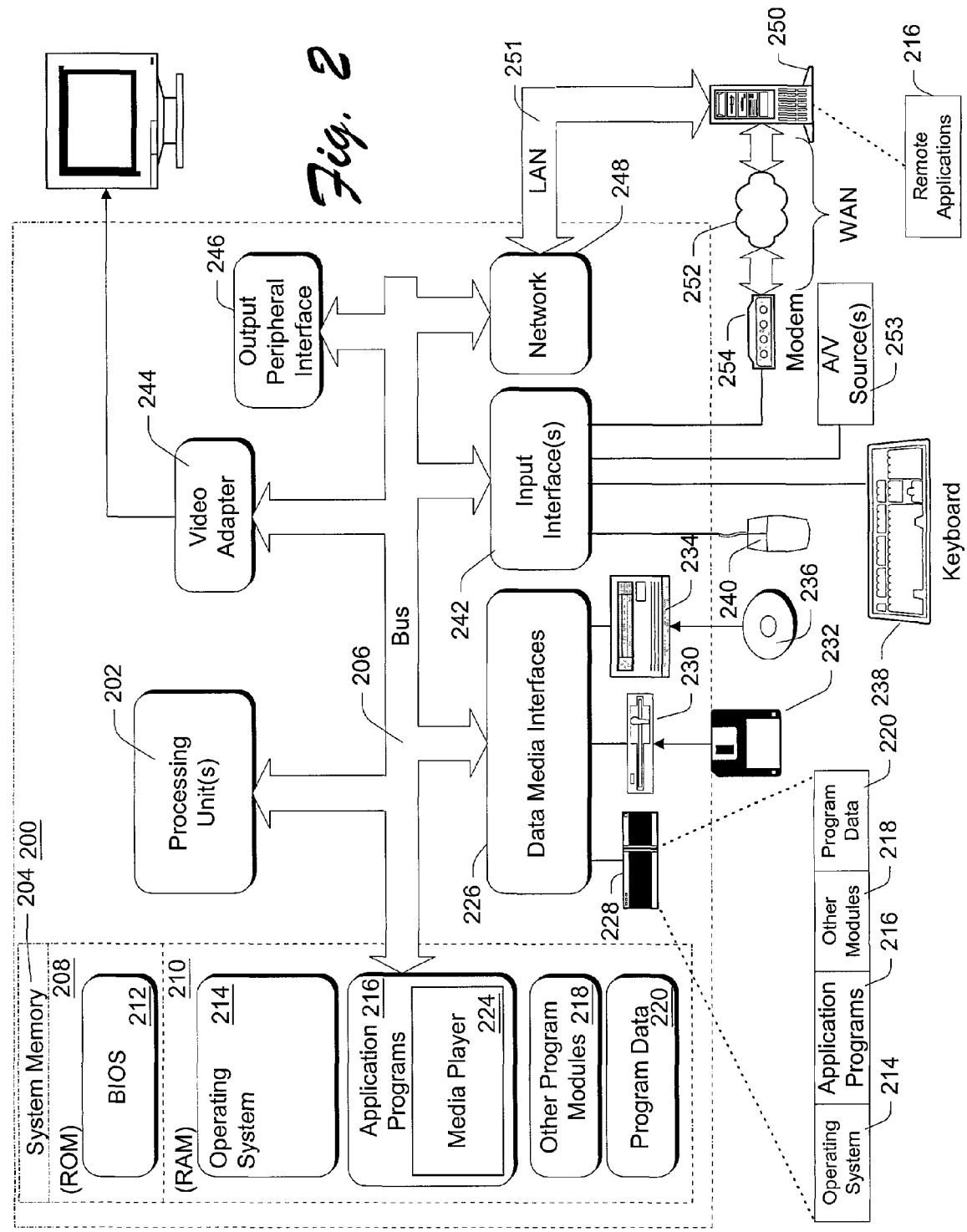
FIG. 2 is a block diagram that illustrates a computing environment in which various embodiments can be implemented.

FIG. 2 illustrates an example of a suitable computing environment 200 on which the inventive systems and methods described below can be implemented.

It is to be appreciated that computing environment 200 is only one example of a suitable computing environment and is not intended to suggest any limitation as to the scope of use or functionality of the inventive embodiments described below. Neither should the computing environment 200 be interpreted as having any dependency or requirement relating to any one or combination of components illustrated in the exemplary computing environment 200.

The inventive techniques can be operational with numerous other general purpose or special purpose computing system environments or configurations. Examples of well known computing systems, environments, and/or configurations that may be suitable for use with the inventive techniques include, but are not limited to, personal computers, server computers, thin clients, thick clients, hand-held or laptop devices, multi-processor systems, microprocessor-based systems, set top boxes, programmable consumer electronics, network PCs, minicomputers, mainframe computers, distributed computing environments that include any of the above systems or devices, and the like.

In certain implementations, the inventive techniques can be described in the general context of computer-executable instructions, such as program modules, being executed by a computer. Generally, program modules include routines, programs, objects, components, data structures, etc. that perform particular tasks or implement particular abstract data types. The inventive techniques may also be practiced in distributed computing environments where tasks are performed by remote processing devices that are linked through a communications network. In a distributed computing environment, program modules may be located in both local and remote computer storage media including memory storage devices.

In the illustrated example, computing system 200 comprises one or more processors or processing units 202, a system memory 204, and a bus 206 that couples various system components including the system memory 204 to the processor 202.

Bus 206 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 200 typically includes a variety of computer readable media. Such media may be any available media that is locally and/or remotely accessible by computer 200, and it includes both volatile and non-volatile media, removable and non-removable media.

In FIG. 2, the system memory 204 includes computer readable media in the form of volatile, such as random access memory (RAM) 210, and/or non-volatile memory, such as read only memory (ROM) 208. A basic input/output system (BIOS) 212, containing the basic routines that help to transfer information between elements within computer 200, such as during start-up, is stored in ROM 208. RAM 210 typically contains data and/or program modules that are immediately accessible to and/or presently be operated on by processing unit(s) 202.

Computer 200 may further include other removable/non-removable, volatile/non-volatile computer storage media. By way of example only, FIG. 2 illustrates a hard disk drive 228 for reading from and writing to a non-removable, non-volatile magnetic media (not shown and typically called a "hard drive"), a magnetic disk drive 230 for reading from and writing to a removable, non-volatile magnetic disk 232 (e.g., a "floppy disk"), and an optical disk drive 234 for reading from or writing to a removable, non-volatile optical disk 236 such as a CD-ROM, DVD-ROM or other optical media. The hard disk drive 228, magnetic disk drive 230, and optical disk drive 234 are each connected to bus 206 by one or more interfaces 226.

The drives and their associated computer-readable media provide nonvolatile storage of computer readable instructions, data structures, program modules, and other data for computer 200. Although the exemplary environment described herein employs a hard disk 228, a removable magnetic disk 232 and a removable optical disk 236, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 228, magnetic disk 232, optical disk 236, ROM 208, or RAM 210, including, by way of example, and not limitation, an operating system 214, one or more application programs 216 (e.g., media player 224), other program modules 218, and program data 220. Some of the application programs can be configured to present a user interface (UI) that is configured to allow a user to interact with the application program in some manner using some type of input device. This UI is typically a visual display that is capable of receiving user input and processing that user input in some way. Such a UI may, for example, comprises one or more buttons or controls that can be clicked on by a user. Media player application 224 can be any suitable media player application that is configured to play any suitable media so that a user can experience the content that is embodied on the media. Two exemplary media player applications can include a CD media player application and a DVD media player application.

Continuing with FIG. 2, a user may enter commands and information into computer 200 through input devices such as keyboard 238 and pointing device 240 (such as a "mouse"). Other input devices may include a audio/video input device(s) 253, a microphone, joystick, game pad, satellite dish, serial port, scanner, or the like (not shown). These and other input devices are connected to the processing unit(s) 202 through input interface(s) 242 that is coupled to bus 206, but may be connected by other interface and bus structures, such as a parallel port, game port, or a universal serial bus (USB).

A monitor 256 or other type of display device is also connected to bus 206 via an interface, such as a video adapter 244. In addition to the monitor, personal computers typically include other peripheral output devices (not shown), such as speakers and printers, which may be connected through output peripheral interface 246.

Computer 200 may operate in a networked environment using logical connections to one or more remote computers, such as a remote computer 250. Remote computer 250 may include many or all of the elements and features described herein relative to computer 200.

As shown in FIG. 2, computing system 200 can be communicatively coupled to remote devices (e.g., remote computer 250) through a local area network (LAN) 251 and a general wide area network (WAN) 252. Such networking environments are commonplace in offices, enterprise-wide computer networks, intranets, and the Internet.

When used in a LAN networking environment, the computer 200 is connected to LAN 251 through a suitable network interface or adapter 248. When used in a WAN networking environment, the computer 200 typically includes a modem 254 or other means for establishing communications over the WAN 252. The modem 254, which may be internal or external, may be connected to the system bus 206 via the user input interface 242, or other appropriate mechanism.

In a networked environment, program modules depicted relative to the personal computer 200, or portions thereof, may be stored in a remote memory storage device. By way of example, and not limitation, FIG. 2 illustrates remote application programs 216 as residing on a memory device of remote computer 250. It will be appreciated that the network connections shown and described are exemplary and other means of establishing a communications link between the computers may be used.

Physical Media Identification and Unique Logical ID Mapping

In one described embodiment, a physical ID or "PID" is associated with each media upon which the content that is to be experienced by a user resides. The PID is assigned or otherwise associated with a logical ID or "LID", and the LID is then used as the basis for any database queries.

Figure 3:
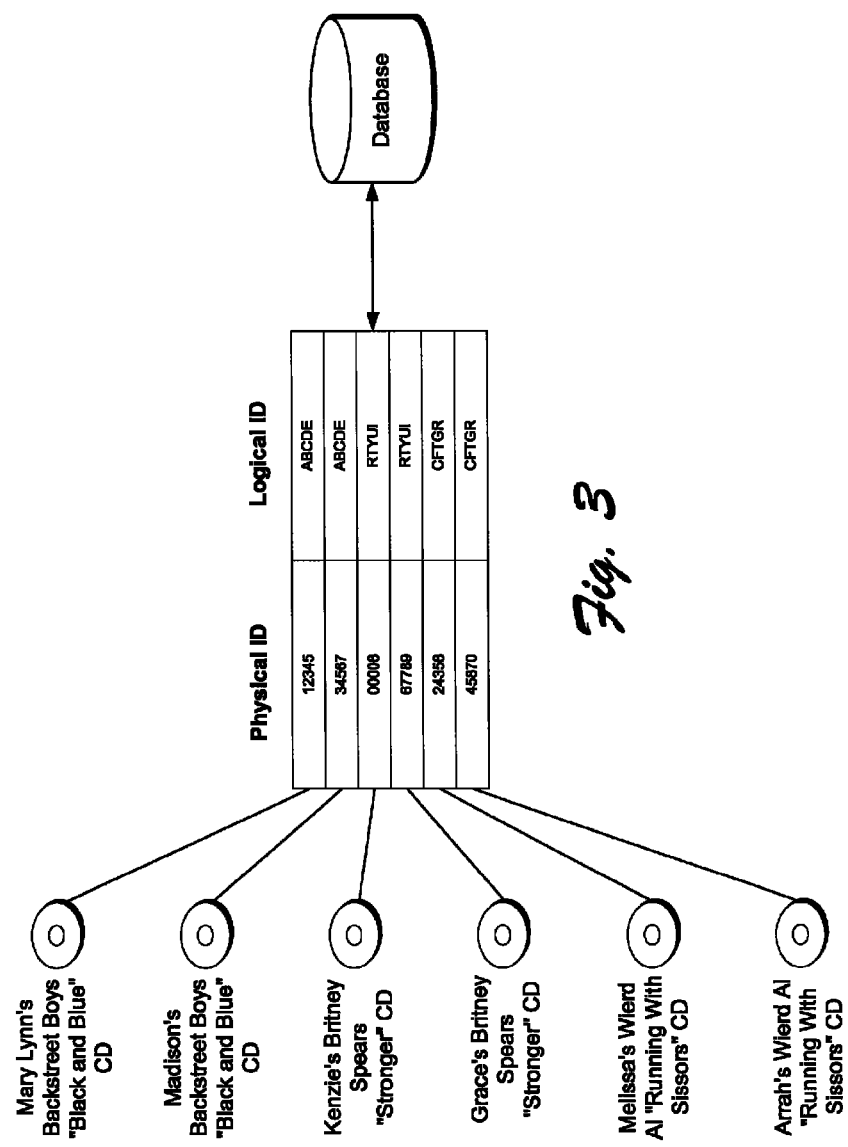
FIG. 3 is a diagram that illustrates aspects of physical IDs and logical IDs in accordance with one embodiment.

Consider, for example, FIG. 3. There, six CDs are shown—two each of the Backstreet Boys "Black and Blue" CD, Britney Spears "Stronger" CD and Weird Al's "Running with Sissors" CD. Each of these CDs belongs to a different person. As shown, each CD has a physical ID associated with it. Each physical ID is different. For example, there are two different physical IDs associated with the Backstreet Boys CD (i.e. "12345" and "34567"). Yet, each of these different physical IDs is mapped to the same logical ID (i.e. ABCDE). This logical ID is then used by the system as the basis for any database queries for metadata associated with the Backstreet Boys CD.

With respect to the physical IDs that are associated with the media, any suitable method or technique of generating a physical ID can be used. For example, when a user inserts a piece of media into a properly configured and enabled device, a piece of software code can execute and read data from the physical media. The software code can then compose a unique or nearly unique physical ID from that data.

In the case where the media comprises a CD, the software code can read the offsets (in frames, which have a resolution of $1/72^{nd}$ of a second) of each track on the disc. A composite key or physical ID is then built and comprises a string of the hex values of these offsets, prefaced by a number of tracks on the disc and 11 finished with a representation of the total length of the disc.

In the case where the media comprises a DVD, the software code can read the first 64 kilobytes of two files that are guaranteed to be on every DVD. These files are VIDEO_TS.IFO and VTS_01_0.IFO. The former contains main-menu information (VMGI), and the latter contains title set information (VTSI) for the first title on the DVD. After the appropriate data blocks are read, the code generates a 64-bit CRC (cyclic redundancy code) checksum of the data, resulting in an appropriately unique key or physical ID.

Of course, it is to be understood that the above two examples are simply two ways that a physical ID can be generated for two different types of media. Other methods of generating physical IDs, as well as other media types can be employed.

Calculation of the physical IDs takes place, in this example, on the client side by software code that executes on the client. Such code can comprise part of a software-implemented media player that is configured to play the media of interest.

Figure 4:
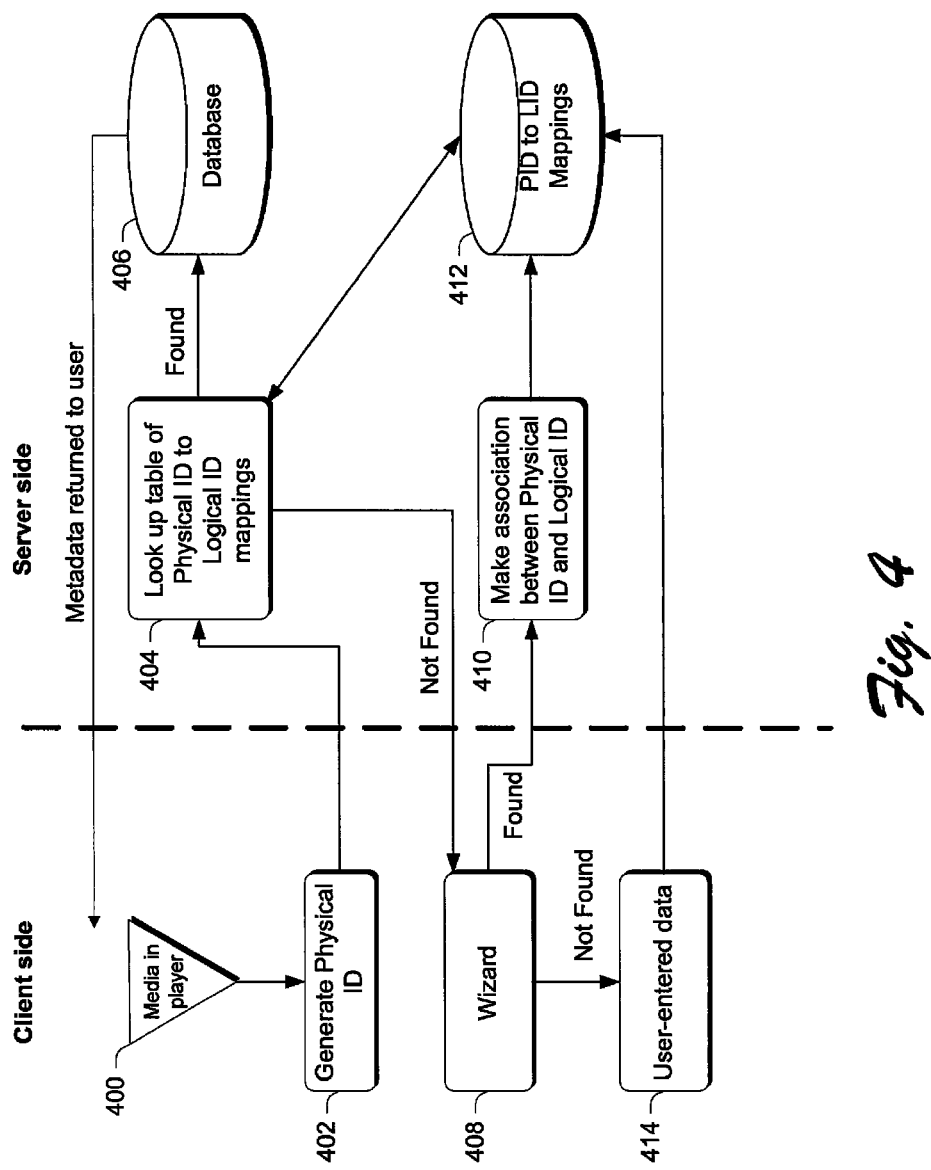
FIG. 4 is a flow diagram that illustrates some general inventive concepts.

Once the physical IDs are generated, the physical IDs are sent, via a network such as the Internet and using a suitable protocol, for processing that is described in detail below. To assist in understanding, at a more global level, the processing that takes place, including generation of the physical IDs, the reader is referred to FIG. 4. FIG. 4 is a work flow diagram that is useful in understanding the processing that takes place on and between the client and the server in accordance with one embodiment. More detailed discussion on certain aspects of the FIG. 4 diagram appears in other sections below.

At 400 a user inserts a particular media into an enabled media player and, at 402, a physical ID is generated for the particular piece of media. Examples of how physicals IDs can be generated are given above. This physical ID is then bundled up and sent to a server system for processing. This bundling can be done in any suitable way using any suitable protocols. In one example, the physical ID is passed, through an HTTP URL, to the server system. The server system can be configured in any suitable way. In this example, the server can comprise active server pages (ASP) code residing thereon running Microsoft's Internet Information Server product. The code can also include a mechanism for converting the ASP request into a Microsoft SQL Server XML query request, as will be understood by those of skill in the art.

The physical ID is then used to query a lookup table 404 to determine whether there is a proper logical ID associated with it. The logical ID represents the piece of media in a metadata store or database 406. If there is a logical ID associated with the physical ID, then that logical ID serves as a basis for a query of database 406. This query then returns, to the user, metadata associated with the user's media. This metadata can comprise a rich collection of data, with non-limiting examples being given above.

If, on the other hand, no logical ID can be found for the user's physical ID, then a Wizard 408 is presented to the user, on the client side, to attempt to find or establish a logical ID for the user's piece of media or, more accurately, the physical ID that is associated with the user's piece of media. For example, assume that a user starts playing a CD that has a physical ID that has not yet been processed by the system. When the server attempts to look up a logical ID associated with the media's physical ID, no corresponding logical ID will be found. Accordingly, the server then presents the Wizard to the user and attempts to identify the user's media. The reason that the Wizard attempts to identify the user's media is that there may already exist a logical ID that is associated with the media. Recall that the same CD (e.g. U2's newest CD) may have several different physical IDs associated with it, yet there will be only one logical ID to which all of these physical IDs are mapped. If the system has not yet processed the user's physical ID, it will seek to establish an association between that physical ID and the logical ID that already exists in the system for that particular CD.

One example, of how this is done is given below in the section entitled "Wizard". If the Wizard is successful in identifying the user's media (e.g. if the user is successful in identifying their media using the Wizard), and there exists a logical ID for the user's media, the server will establish, at 410, a physical ID to logical ID mapping for the user's specific physical ID. The mapping will then map the user's specific physical ID to the logical ID that is associated with the user's media. This association is stored on a database 412 that contains physical ID to logical ID mappings.

If the Wizard 408 is unsuccessful in identifying the user's particular media, then the user can provide user-entered data at 414 that is then used to identify the media for the system. The user can not only enter their own data for their media (such as title, tracks and artist), but they can also establish a physical ID to logical ID mapping for that media. This new logical ID will thus serve as the logical ID for all subsequent physical IDs that are associated with that media. Consider, for example, a situation in which a particular user is the first system user to play a new CD. In this case, the system may not include a logical ID for the new physical media. Accordingly, the first user then, through the Wizard, can be prompted to enter any relevant information for the CD (i.e. title, artist, tracks, track titles and the like), as well as a logical ID for the media so that an association can be established on the server.

Exemplary Look-Up Process

In accordance with one embodiment, a process handles logical ID lookup failures by transferring control to increasingly more exhaustive search processes. The description provided just below expands upon the box 404 in FIG. 4.

Figure 5:
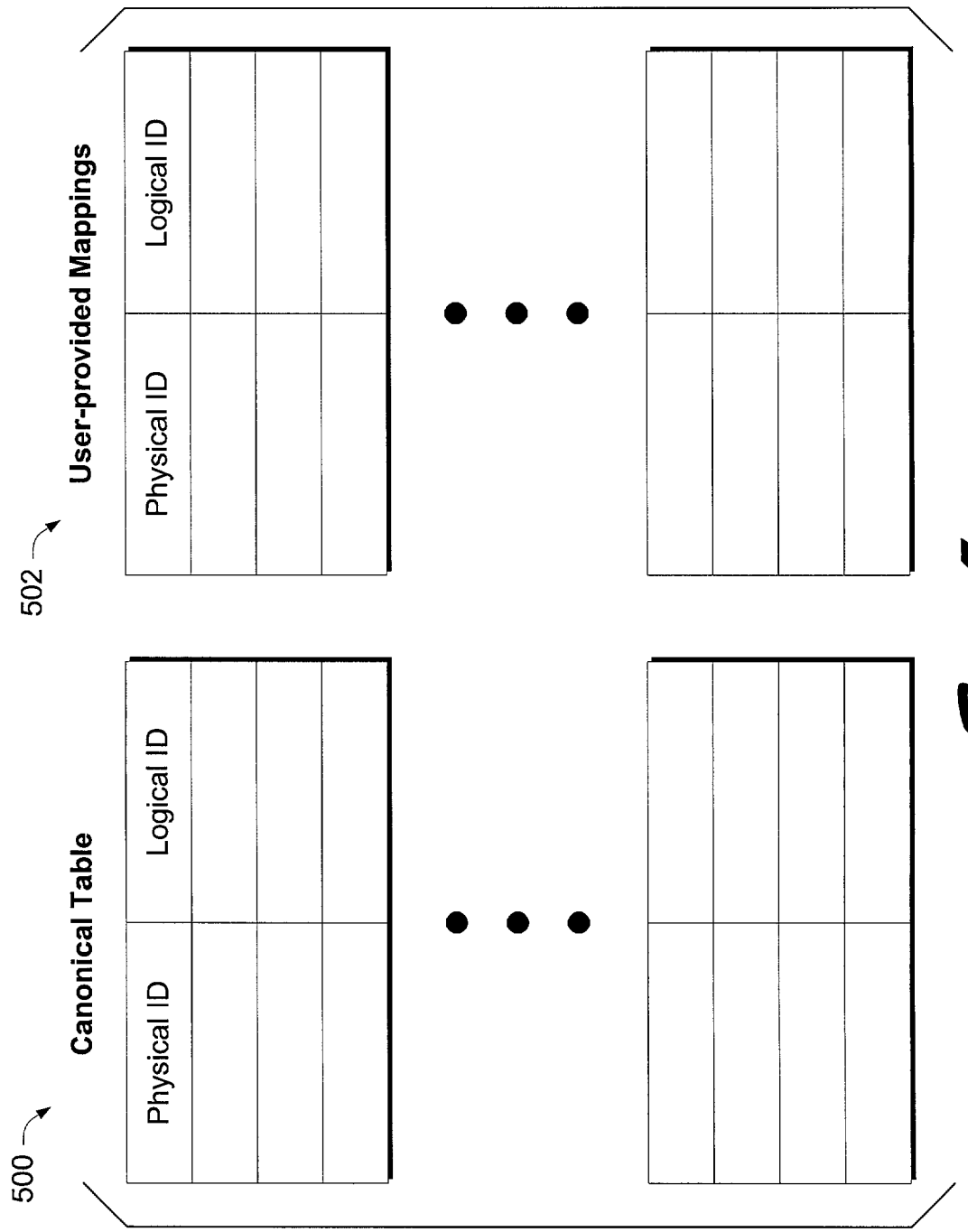
FIG. 5 is a block diagram that illustrates a canonical table and a user-provided mappings table in accordance with one embodiment.

FIG. 5 illustrates two tables that are generated and maintained in accordance with one embodiment. Table 500 is a canonical table that holds trusted physical ID to logical ID mappings. This table can be maintained on the server side in, for example, database 412 (FIG. 4). Database 412 can also include a second table 502 that holds user-provided or user-entered physical ID to logical ID mappings. The user-provided mappings can be those that are entered on the same day. This is advantageous from the standpoint of providing a system that immediately incorporates user feedback for use by others. It will be appreciated that user-provided data is typically less trusted than the trusted data or mappings. To deal with this issue, security measures can be put in place to ensure the integrity of the user-provided data. Exemplary measures are described in detail below in the section entitled "User Feedback Gathering and Management System".

When a media's physical ID is received by the server system, a first search is conducted on the trusted table 500. This search looks for a corresponding physical ID that has been mapped to a logical ID. The first search is a low cost search that is configured to search the database quickly. A low cost search can include searches that use a few elements to determine a match. If a matching physical ID to logical ID mapping is found, then the logical ID is used as the basis for a database search to retrieve any relevant metadata. If, on the other hand, a matching physical ID is not found, then a second search is conducted. This second search is conducted on the less trusted table 502—the user-provided mappings. If a matching physical ID to logical ID mapping is found, then the logical ID is used as the basis for a database search to retrieve any relevant metadata. The search is desirably another low cost search. If no match is found on this second search, then a third search is conducted back on trusted table 500. This search is a higher cost search that more extensively searches the table. A higher cost search is a search that can use more elements than the low cost search to determine a match. If a match is found, then the corresponding logical ID is used as the basis for a database query. If no match is found, then in one embodiment, the process fails and returns no metadata. The process can also launch into a mode in which the user is prompted to enter information associated with their specific media so that a logical ID can be established for that particular piece of media, and a physical ID to logical ID mapping can be formed. This is part of the processing that takes place using the Wizard, which is discussed in more detail below in the section entitled "Wizard".

The above-described process contributes strongly to the functionality of this embodiment as it not only searches a more extensive set of information for matches, but also allows user-entered data to have an immediate effect on the overall system. If the system fails to find an appropriate match in the user-entered data, it tries a final, more exhaustive search on the canonical table. This fail-over behavior provides very strong performance in the most common case, and varying degrees of slightly degraded performance in the progressively less common cases. The overall result is more immediate physical to logical ID mappings, and more frequent return of metadata for a piece of media.

Figure 6:
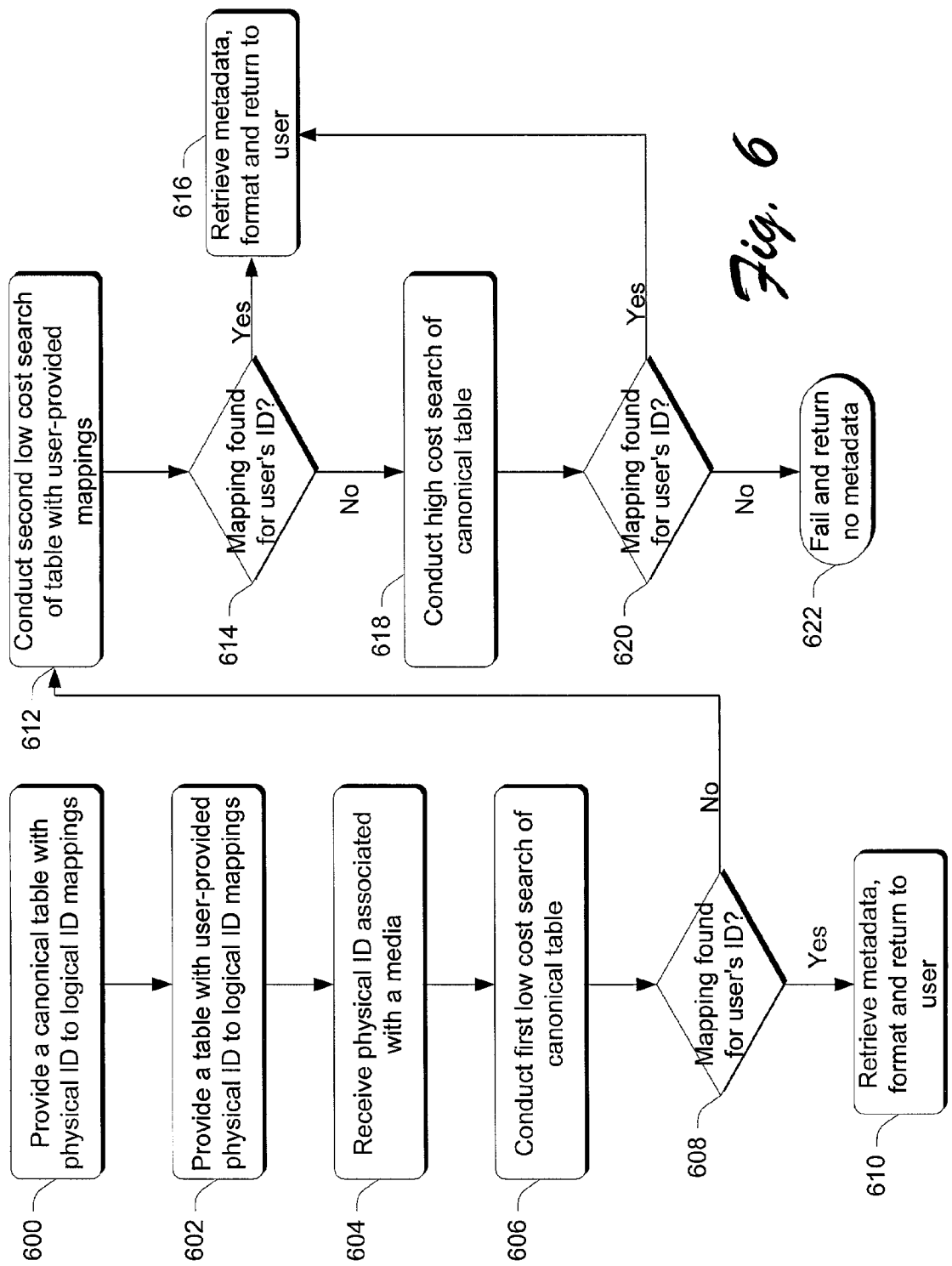
FIG. 6 is a flow diagram that illustrates steps in a method in accordance with one embodiment.

FIG. 6 is a flow diagram that describes steps in a method in accordance with the above-described embodiment. The method can be implemented in any suitable hardware, software, firmware or combination thereof. In the illustrated and described embodiment, the method is implemented in software executing on the server side.

Step 600 provides a canonical table with physical ID to logical ID mappings. The mappings contained in this table are trusted mappings. Step 602 provides a table with user-provided physical ID to logical ID mappings. This table is not a trusted table. Step 604 receives a physical ID associated with a media such as a CD or DVD. Step 606 conducts a first low cost search of the canonical table, and step 608 determines whether there is a matching physical ID with a logical ID mapping in the canonical table. If there is a matching physical ID, then step 610 uses the logical ID as the basis of a database search and retrieves, formats and returns associated metadata to the user or client computer. If, on the other hand step 608 fails to find a matching physical ID, step 612 conducts a second low cost search of the table containing the user-provided mappings, i.e. the less trusted or untrusted table. Step 614 determines whether there is a matching physical ID with a logical ID mapping in this table. If there is, then step 616 uses the logical ID as the basis of a database search and retrieves, formats and returns associated metadata to the user or client computer. If, on the other hand, step 614 finds no match, step 618 performs a high cost search of the canonical table. Step 620 determines whether there is a matching physical ID with a logical ID mapping in the canonical table. If there is, the method branches to step 616. If there is no match, then step 622 fails and returns no metadata. Further processing after failure can include engaging the user via a Wizard for the purpose of establishing a logical ID for the user's specific media.

Wizard

In one embodiment, a Wizard is provided to assist in identifying a user's specific media so that a physical ID to logical ID mapping can be made. The 19 Wizard can also assist in establishing a physical ID to logical ID mapping for the user's specific media in the event that the user's specific media cannot be identified. Specifically, recall in FIG. 4 that failing, at 404, to locate a physical ID to logical ID mapping, a Wizard 408 is presented to assist in the discovery process. The discussion below presents but one embodiment of a Wizard that can be used to assist in finding and/or establishing a physical ID to logical ID mapping.

Figure 7:
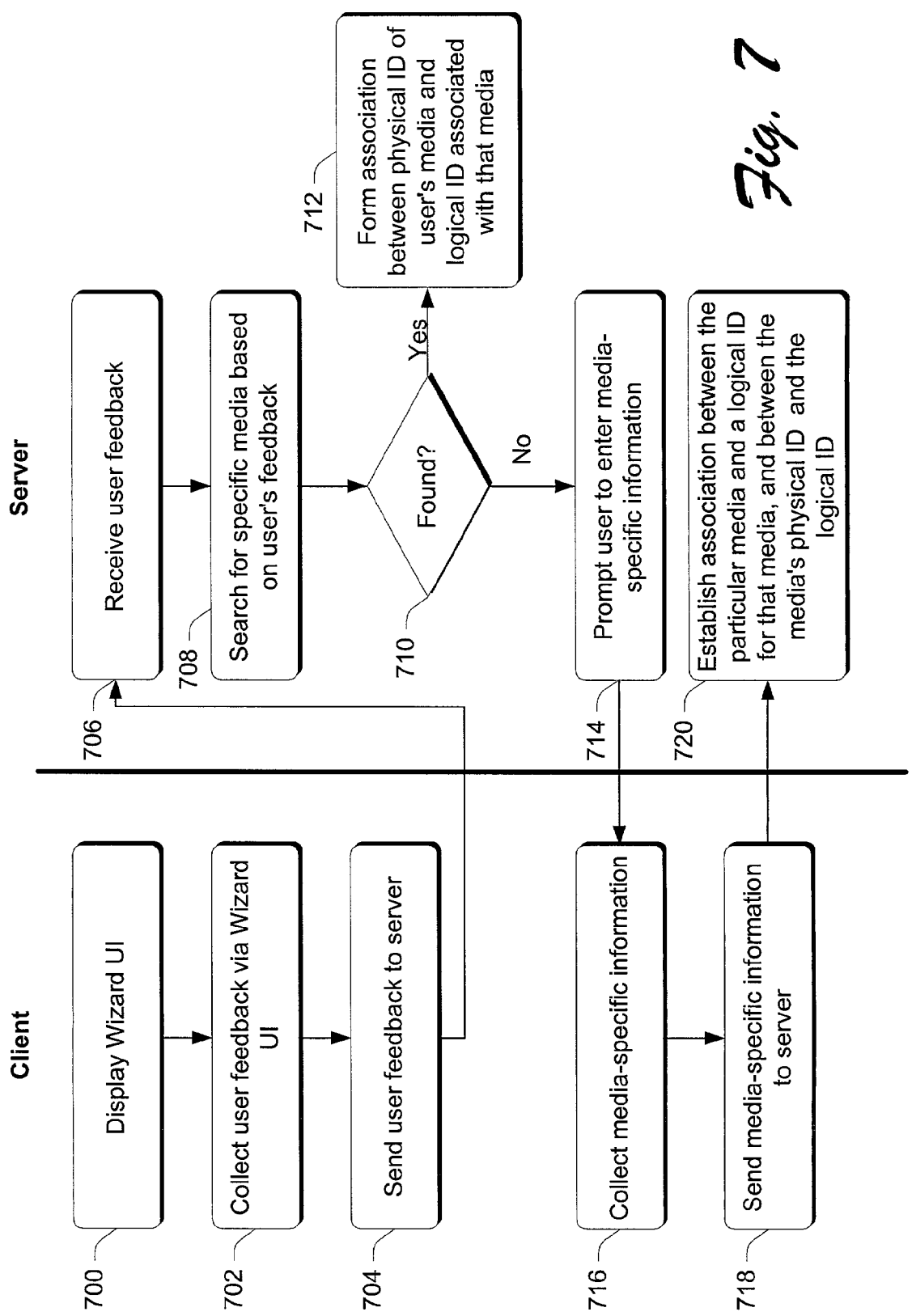
FIG. 7 is a flow diagram that illustrates steps in a method in accordance with one embodiment.

FIG. 7 is a flow diagram that describes steps in a method in accordance with one embodiment. The steps can be implemented in any suitable hardware, software, firmware or combination thereof. In the illustrated and described embodiment, the steps are implemented in software. This software can reside on the server side of the system or on the client side of the system. In this particular example, the software resides on the server side of the system, although steps are implemented on both the client and the server side. To this extent, FIG. 7 is divided into two different sections—one labeled "Client" to depict steps that occur on the client side, and one labeled "Server" to depict steps that occur on the server side.

Step 700 displays a Wizard UI on a client computer. The Wizard can be implemented in any suitable software. In the illustrated example, the Wizard is implemented using Active Server Pages and DHTML. This step can be implemented, in the described embodiment, upon a failure to find a logical ID associated with a physical ID that has been provided by the client. For example, a user might insert a CD into their computer, where the CD has a physical ID that has not yet been logged in the system. Because the physical ID will not be found by the server, the services of the Wizard will be employed to attempt to identify the specific media so that a logical ID can be associated with its physical ID. This will become more clear as the example of FIGS. 8-12 is considered below.

Step 702 collects user feedback or information via the Wizard UI. In this step, the Wizard attempts to collect specific information associated with the user's media. This specific information can include any information that can be used by the system to assist it in establishing a physical ID to logical ID mapping. For example, if the media comprises a music CD, the user can provide feedback in the form of the artist's name or album title. Step 704 then sends the user feedback to the server. Step 706 receives the user feedback and step 708 searches for specific media based on the user's feedback. It will be appreciated and understood that steps 702, 704, 706 and 708 can take place multiple times between the client and server. Such can be the case where, for example, the Wizard uses the user's feedback to provide a number of possible selections, and then progressively narrows down the choices based on the user's additional feedback. This will become evident in the example that follows.

If, at step 710, a specific media is found to coincide with the user-provided feedback, then step 712 forms an association between the physical ID associated with the user's media, and the logical ID associated with that media. Now, whenever the user plays that particular piece of media in their media player, the server will be able to use the physical ID to retrieve the associated logical ID, so that it can then query the database(s) that contains the metadata associated with that particular piece of media.

If, on the other hand, step 710 is unsuccessful, then step 714 can prompt the user to enter media specific information about their media. Step 716 collects media-specific information from the user. The step can be implemented by the user entering information that, for a CD, can include album title, artist, track titles, and the like. The user can also enter a logical ID that is to be associated with that particular piece of media. Step 718 then sends the media-specific information to the server, and step 720 establishes an association between that particular piece of media and a logical ID for the media, as well as the physical ID for the particular piece of media and the logical ID. It should be noted that steps 714, 716, 718, and 720 can be performed when the user is the first user to play their media in an enabled player and the media has not yet been incorporated into the system. For example, if U2's new CD has just been released and has not yet been incorporated into the system (i.e. a logical ID has not yet been established for it), then the first user to play the U2 CD in their enabled player can step through steps 716-718 so that a logical ID can be established on the server for the new CD.

Figure 8:
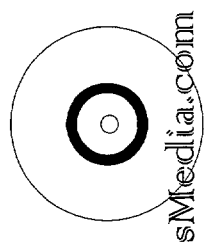
Figure 12:
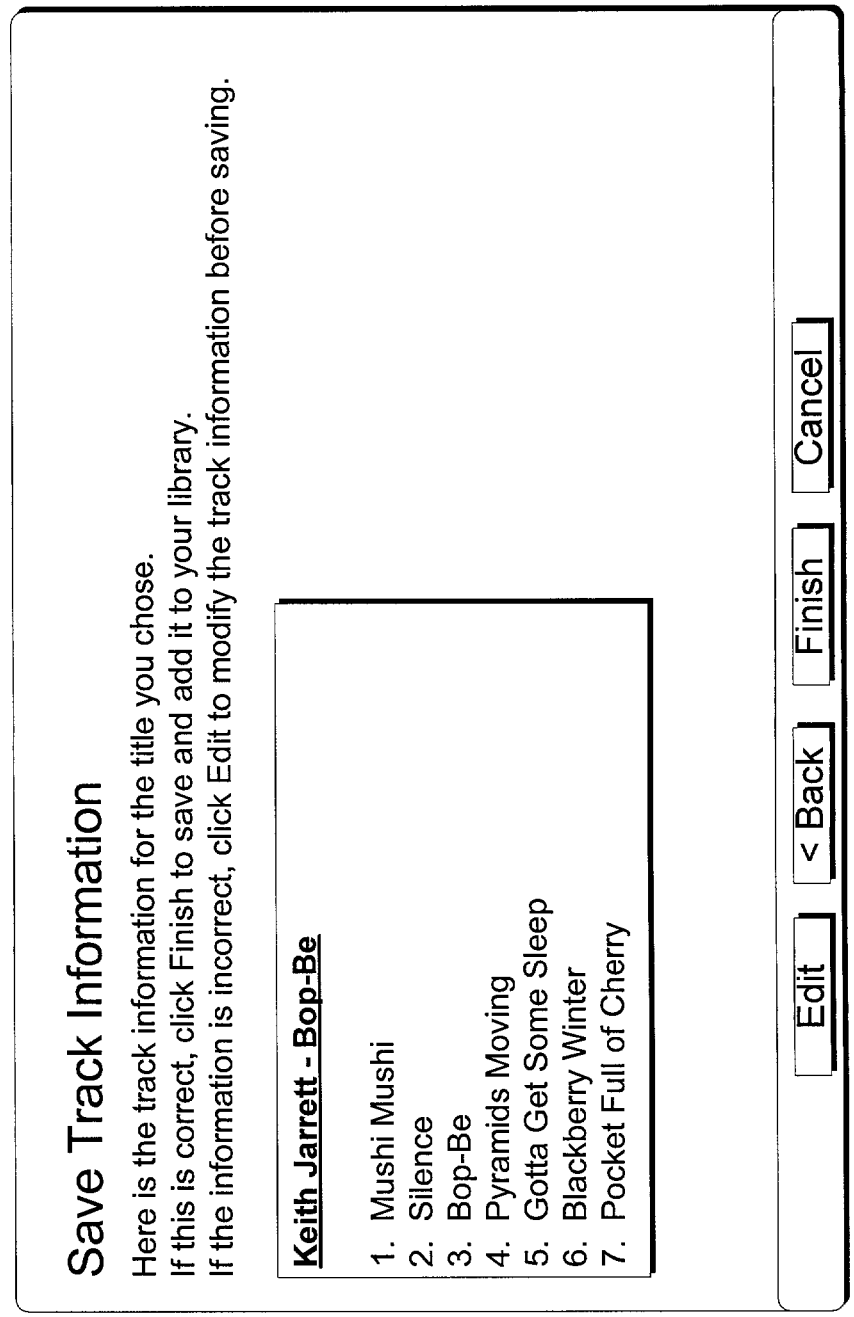

FIGS. 8-12 show an exemplary Wizard UI 800 that can be provided in one implementation. FIG. 8 shows a start UI that is displayed on a client machine and coincides with step 700 in FIG. 7. FIG. 9 shows a UI in which the user can provide feedback pertaining to an artist's name for a particular CD that they have inserted into their enabled CD player. Once the artist's name is entered, this information is provided to the server which begins searching for a specific media associated with that artist. This coincides with step 708 in FIG. 7. Searching for the specific media can take many forms. Additionally, the searching can involve multiple iterations with the user to narrow down search results. For example, FIG. 10 shows a UI that is presented to the user that lists multiple artists that closely match the artist's name entered by the user. Once the user locates their particular artist, they can select the artist. The user's selection is then provided to the server (as by step 704 in FIG. 7) so that the server can narrow down its search somewhat more. Specifically, FIG. 11 shows a UI that is presented to the user. The UI lists various disc titles for the artist that has been confirmed by the user. The user can then select the disc title that corresponds to the CD that they are playing. Once the user selects the appropriate disc title, an association can be made on the server that associates the specific physical ID associated with the user's media, with a corresponding logical ID that can be used as the basis of database searches. FIG. 12 is a UI that confirms the track information for the disc title that was selected by the user.

Retrieving, Formatting and Delivering Metadata

After a proper logical ID is found (for example, steps 608, 614, and 620 in FIG. 6), querying code looks for and gathers metadata from the appropriate metadata database(s) based on the logical ID (corresponding to steps 610 and 616 in FIG. 6). Any suitable querying code can be used. In the illustrated and described embodiment, the querying code is SQL querying code.

The metadata is gathered by procedure code that fetches it from publishing schema for the data. The schema is flattened to some degree and indexed to provide very fast data retrieval.

Once the data is gathered, it is formatted for transmission to a client. In the illustrated and described embodiment, formatting takes place via SQLXML (a FOR XML EXPLICIT clause) into one of several extensible metadata delivery schema. These schema vary somewhat based on the type of media that they represent.

In the illustrated and described embodiment, there are three XML schema that are provided. Two of the schema are associated with returning metadata associated with CDs, and one of the schema is associated with returning metadata associated with DVDs.

XML or "Extensible Markup Language" is a meta-markup language that provides a format for describing structured data. XML is similar to HTML in that it is a tag-based language. By virtue of its tag-based nature, XML defines a strict tree structure or hierarchy. XML is a derivative of Standard Generalized Markup Language (SGML) that provides a uniform method for describing and exchanging structured data in an open, text-based format. XML utilizes the concepts of elements and namespaces. Compared to HTML, which is a display-oriented markup language, XML is a general-purpose language used to represent structured data without including information that describes how to format the data for display.

XML "elements" are structural constructs that consist of a start tag, an end or close tag, and the information or content that is contained between the tags. A "start tag" is formatted as "<tagname>" and an "end tag" is formatted as "</tagname>". In an XML document, start and end tags can be nested within other start and end tags. All elements that occur within a particular element must have their start and end tags occur before the end tag of that particular element. This defines a strict tree-like structure. Each element forms a node in this tree, and potentially has "child" or "branch" nodes. The child nodes represent any XML elements that occur between the start and end tags of the "parent" node.

XML accommodates an infinite number of database schemas. Within each schema, a "dictionary" of element names is defined. The dictionary of element names defined by a schema is referred to as a "namespace." Within an XML document, element names are qualified by namespace identifiers. When qualified by a namespace identifer, a tag name appears in the form "[namespace]:[tagname]". This model enables the same element name to appear in multiple schemas, or namespaces, and for instances of these duplicate element names to appear in the same XML document without colliding.

Start tags can declare an arbitrary number of "attributes" which declare "property values" associated with the element being declared. Attributes are declared within the start tag using the form "<[tagname] [attribute1],[attribute2] . . . , [attributeN]>", where an attribute1 through attributeN are declarations of an arbitrary number of tag attributes. Each attribute declaration is of the form "[attributeName]=[attributeValue]" where each attribute is identified by a unique name followed by an "=" character, followed by the value of the attribute.

Within an XML document, namespace declarations occur as attributes of start tags. Namespace declarations are of the form "xmlns:[prefix]=[uri]". A namespace declaration indicates that the XML document contains element names that are defined within a specified namespace or schema. Prefix is an arbitrary designation that will be used later in the XML document as an indication that an element name is a member of the namespace declared by uri. The prefix is valid only within the context of the specific XML document. "Uri" or universal resource indicator is either a path to a document describing a specific namespace or schema or a globally unique identifier of a specific namespace or schema. Uri is valid across all XML documents. Namespace declarations are "inherited", which means that a namespace declaration applies to the element in which it was declared as well as to all elements contained within that element.

Namespace inheritance within an XML document allows non-qualified names to use "default" namespaces. Default namespaces are explicitly declared as attributes of start tags. Default namespace declarations are of the form "xmlns=[uri]". Note that the declaration of a default namespace is equivalent to the declaration of a non-default namespace but the prefix is omitted. A namespace specification within an XML document is said to have a "scope" which includes all child nodes beneath the namespace specification.

| First CD XML Schema |
|---|
| <OMI xmlns:sql="urn:schemas-microsoft-com:xml-sql"><br>    <name> Back Catalogue</name><br>    <author>Front 242</author><br>    <releasedate>1992 06 02</releasedate><br>    <genre>ROCK </genre><br>    <style>Industrial</style><br>    <rating>6</rating><br>    <copyright></copyright><br>    <label>Wax Trax!</label><br>    <parent>AMG</parent><br>    <track><br>        <name>U-Men<name><br>        <author>Front 242</author><br>    </track><br></OMI> |

This particular schema has tags that are associated with the following pieces of information: CD name, author, release date, genre, style, rating, copyright, label, parent, and track (which includes tags for the track name and track author).

| Second CD XML Schema |
|---|
| <?xml version="1.0" encoding="UTF-8" ?><br>    <OMI xmlns:sql="urn:schemas-microsoft-com:xml-sql"><br>    <version>2.0</version><br>        <!-- Description: Version number of this CD OMI<br>        document --><br>    <name>BBC Sessions</name><br>        <!-- Description: Name of album --><br>    <author>Led Zeppelin</author><br>        <!-- Description: Primary Artist or "Various" -<br>        --><br>    <releaseDate>9/18/2000</releaseDate><br>        <!-- Description: Date of initial release --><br>    <label>Warner Brothers</label><br>        <!-- Description: Record label of the release |

Second CD XML Schema

```
        of this disc -->
    <genre>ROCK</genre>
        <!-- Description: AMG-assigned Genre for album
        -->
    <totalLength>74:00</totalLength>
        <!-- Description: Total program time on disc in
        mm:ss format -->
    <style>Rock</style>
        <!-- Description: AMG-assigned Style -->
    <rating />
        <!-- Description: Quality rating: 0= worst,
        9=best -->
    <buyURL>http://windowsmedia.com/mediaguide/buynow/
buynow.asp? </buyURL>
        <!-- Description: URL to "buy album" page on
        windowsmedia.com -->
    <smallCoverURL>http://services.windowsmedia.com/...
</smallCoverURL>
        <!-- Description: URL to small image (50x50) of
        cover art -->
    <largeCoverURL>http://services.windowsmedia.com/...
</largeCoverURL>
        <!-- Description: URL to large image (200x200)
        of cover art -->
    <moreInfoURL />
        <!-- Description: URL to album details page on
        windowsmedia.com -->
    <parent>XXX</parent>
        <!-- Description: Source of data -->
    <copyright>1995</copyright>
        <!-- Description: Year of copyright for
        collection -->
    <track>
        <name>You Shook Me</name>
            <!-- Description: Name of current track -->
        <author>Led Zeppelin</author>
            <!-- Description: Primary performer of current
        track -->
            <composer>Led Zeppelin</composer>
                <!-- Description: Primary composer of
        current track -->
    </track>
</OMI>
```

The schema above provides an opportunity to format and return a more robust collection of data associated with a particular CD. For example, XML tags are associated with information that provides various URLs for various purposes. Specifically, in this example, a "buyURL" tag can be used to send a link to a buy album page where the user can buy additional albums. A "smallCoverURL" tag can be used to provide a URL to a small image of the cover art for a particular CD. A "largeCoverURL" tag can be used to provide a URL to a large image of the cover art for a particular CD. Further, a "moreInfoURL" can be used to provide information associated with album details.

DVD Exemplary Schema

```
<?xml version="1.0" encoding="UTF-8" ?>
<DVDData>
<version>1.0</version>
<relation>
    <coverLarge>http://windowsmedia.com/covers/dvd/
t00032xurnu.jpg</coverLarge>
    <coverSmall>http://windowsmedia.com/covers/dvd/
t00032xurnu.jpg</coversmall>
</relation>
<title>
    <titleNum>1</titleNum>
    <name>Casablanca<name>
    <studio>Warner Home Video</studio>
    <leadPerformer>Humphrey Bogart</leadPerformer>
    <director>Michael Curtiz</director>
    <MPAARating>NR</MPAARating>
    <genre>War Romance</genre>
    <chapter>
        <chapterNum>1</chapterNum>
        <name>Main Title</name>
    </chapter>
</title>
<title>
    <titleNum>2</titleNum>
    <name>Special Features</name>
    <studio>Warner Home Video</studio>
    <leadPerformer>Humphrey Bogart</leadPerformer>
    <director>Michael Curtiz</director>
    <MPAARating>NR</MPAARating>
    <genre>War Romance</genre>
    <chapter>
        <chapterNum>1</chapterNum>
        <name>Casablanca Theatrical Trailer</name>
    </chapter>
</title>
</DVDData>
```

In the above DVD schema example, XML tags are provided for various pieces of information that include relation, title, title number, studio, lead performer, director, MPAA rating, genre, chapter (including tags for chapter number and chapter name). The relation tag serves as a container for various elements that are "related" to the main element.

After the data is formatted into the proper schema, it is sent back over the network to the client application which is then responsible for parsing and rendering the data for the consumer or user.

FIG. 13 is a flow diagram that describes steps in a method in accordance with one embodiment. The steps can be implemented in any suitable hardware, software, firmware or combination thereof. In the illustrated and described embodiment, the steps are implemented in software. The steps about to be described are implemented by a server that has access to and searches for metadata associated with a user's specific media.

Step 1300 searches a metadata database using a logical ID that is associated with a user's media. This step is implemented after a suitable physical ID to logical ID mapping has been found. Any suitable search can be conducted. In the illustrated and described embodiment, the search is a SQL search. Step 1302 retrieves metadata associated with the user's media. The metadata that is retrieved can be any suitable metadata that is provided for the media. Examples of metadata are given above. Step 1304 formats the metadata using an XML schema. Any suitable XML schema can be used. Three exemplary non-limiting XML schemas are given above. XML schemas are characterized by associated tags. The XML tags can be associated with any type of metadata that is or can be envisioned to be provided in connection with a particular type of media. Once the metadata is formatted in an appropriate XML schema, step 1306 sends the formatted metadata to a client.

FIG. 14 is a flow diagram that describes steps in a method in accordance with one embodiment. The steps can be implemented in any suitable hardware, software, firmware or combination thereof. In the illustrated and described embodiment, the steps are implemented in software. The steps about to be described are implemented by a client that receives the formatted data in accordance with FIG. 13.

Step 1400 receives XML-formatted metadata. Step 1402 parses the XML-formatted metadata. Parsing techniques are well-known in the art and, accordingly, are not described in additional detail here. Once the XML data is parsed, step 1404 renders and displays the metadata on the client for the user.

It should be appreciated that the use of XML in the process of formatting and returning metadata to the user is advantageous from a number of perspectives. For example, XML provides a mechanism by which a robust collection of metadata can be returned to the user. Thus, the user experience can be greatly enhanced. Additionally, by virtue of its extensibility, XML provides a mechanism that allows metadata databases to be flexibly managed to accommodate new and different types of metadata. This is highly desirably given the likelihood that metadata types will continue to evolve into the future.

User Feedback Gathering and Management System

In accordance with one embodiment, user-submitted information can be integrated into various data stores in a secure and automated way. Recall from the above discussion that users can, in some instances, provide their own data that can be used to establish physical ID to logical ID mappings. This embodiment recognizes that no collection of physical ID to logical ID mappings will ever be absolutely complete. Accordingly, a mechanism is provided by which a single user can contribute a mapping fairly effortlessly to the system.

It should be appreciated that any system which empowers users in this manner necessarily opens itself up to significant risks of tampering, erroneous entries, and other security concerns. In the discussion below, an approach is provided that deals with automatically analyzing user-provided data to be incorporated in such a way that it is reasonably certain to be accurate, and is self-correcting in the case where it is not accurate.

As an overview, consider the following. When the server system initially fails to retrieve an appropriate logical ID, the system can further prompt the user to attempt to make a logical-physical match by searching the database of all possible choices. Examples of this have been given above. If a search is successful, and the user confirms a match, that information is entered into a holding area which will be referred to as a "user feedback table". Information in the user feedback table is immediately incorporated into all future physical-logical ID mapping attempts. This means that a new mapping is available to all other users of the system immediately upon entry. This results in an immediate potential increase in metadata returns.

Because of the method of operation of the fail-over query system, the user-entered mapping is immediately available for consumption if no previous mapping for that physical ID exists in the canonical table. This corresponds to box 414 in FIG. 4.

In addition to the immediate feedback operation, the contents of the user feedback table are processed or evaluated by a statistical system, on a regular basis, to help ensure the overall quality and reliability of the mapping data. This statistical system processes the user feedback table on a periodic basis (i.e. every night), and processes each and every physical ID that has been entered since its last runtime. For each physical ID, it queries the entirety of previously entered user feedback for that physical ID, as well as the current canonical mapping of that physical ID. It weights the canonical mapping with an appropriate variable weight (e.g. 50 times a normal mapping), and adds it to a statistical distribution of physical-logical ID mappings from the user feedback table. If any one single mapping exceeds a definable threshold (e.g. receives 50% or more of the total weighted distribution), then the mapping that exceeds the threshold is published into the canonical table. Conversely, if no single mapping exceeds the definable threshold (e.g. receives 50% or more of the total weighted distribution), then the mapping is in question and is removed from the lookup table.

Figure 15:
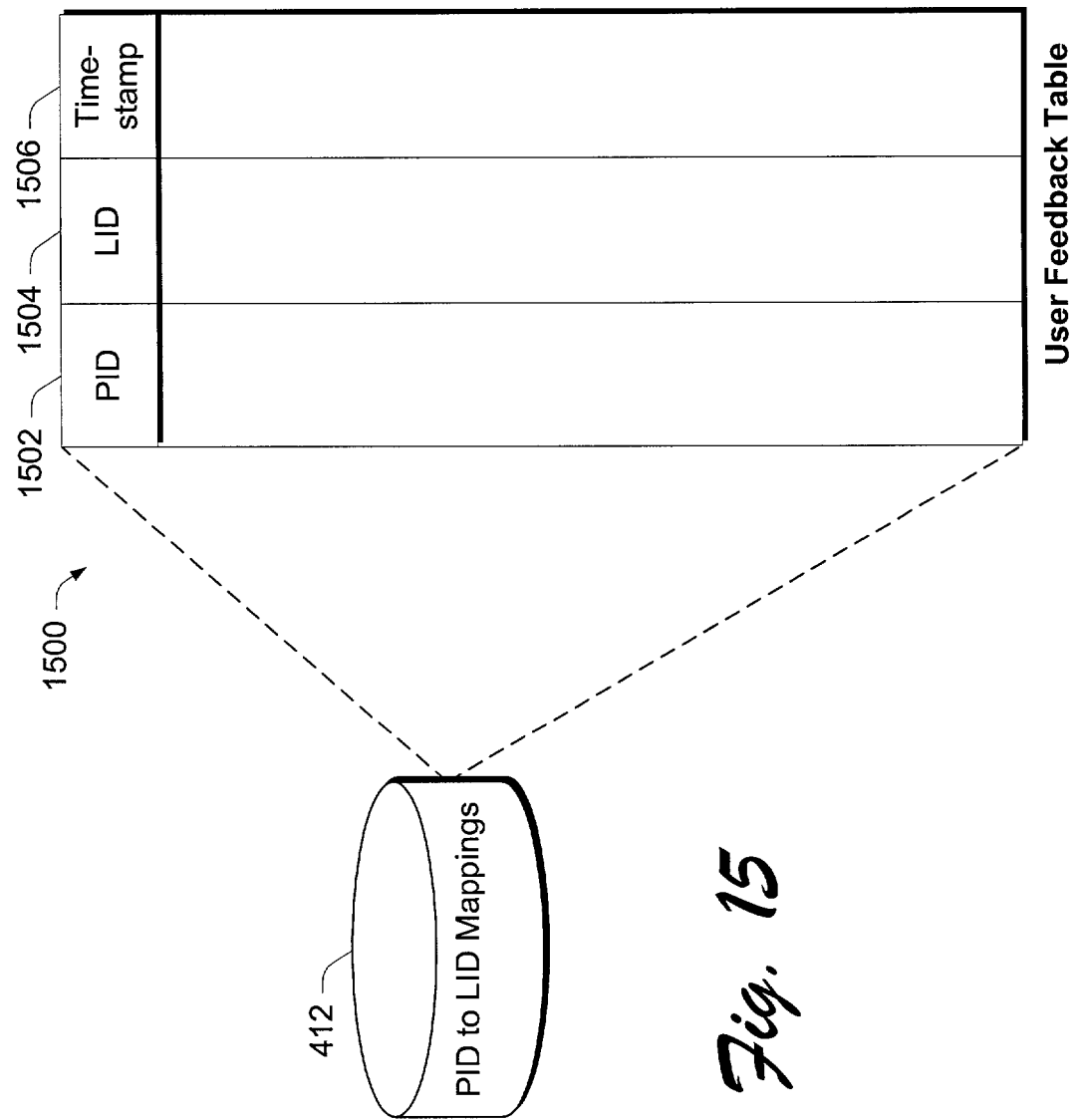
FIG. 15 is a block diagram that illustrates a user feedback table in accordance with one embodiment.

Consider, for example, FIG. 15. There, database 412 contains a user feedback table 1500. This table can be very large (e.g. millions and millions of rows long) and contains potentially valid physical ID to logical ID mappings that were entered by users. The server system can process table 1500 on a nightly basis so that it can be cycled into the trusted canonical table discussed above.

In the illustrated and described user feedback table, column 1502 is associated with physical IDs, column 1504 is associated with logical IDs to which corresponding physical IDs are mapped, and column 1506 is associated with a timestamp. The timestamp for each mapping indicates the time when it was entered into the user feedback table 1500. On a regular basis, the system processes the physical IDs that have been entered by users for purposes of ascertaining whether they should be entered into the canonical table. This process also desirably serves to filter erroneous or spuriously-entered mappings.

Figure 16:
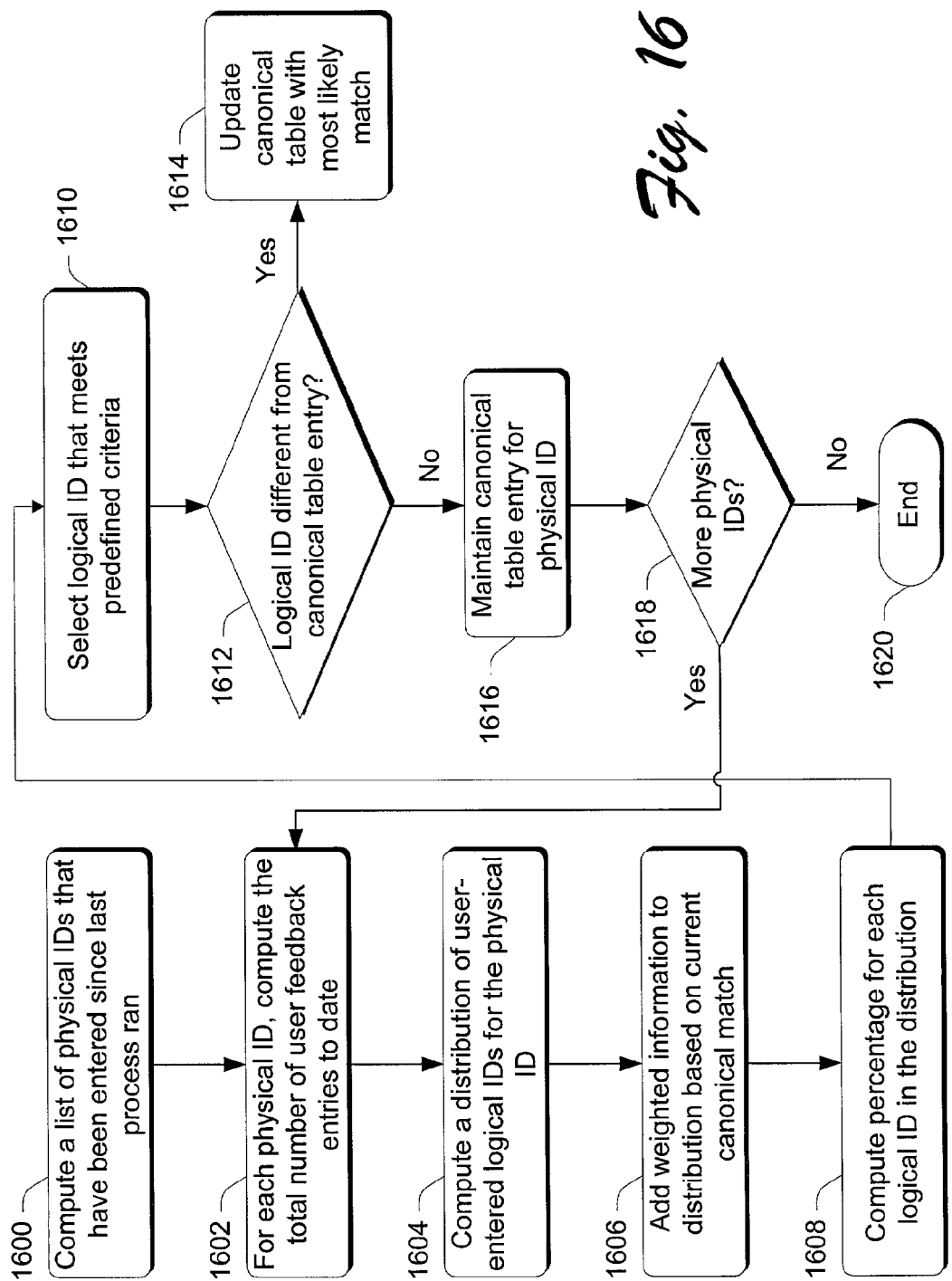
FIG. 16 is a flow diagram that illustrates steps in a method in accordance with one embodiment.

FIG. 16 is a flow diagram that describes steps in a method managing user-provided entries in accordance with one embodiment. The steps can be implemented in any suitable hardware, software, firmware or combination thereof. In the illustrated and described embodiment, the steps are implemented in software.

Figure 17:
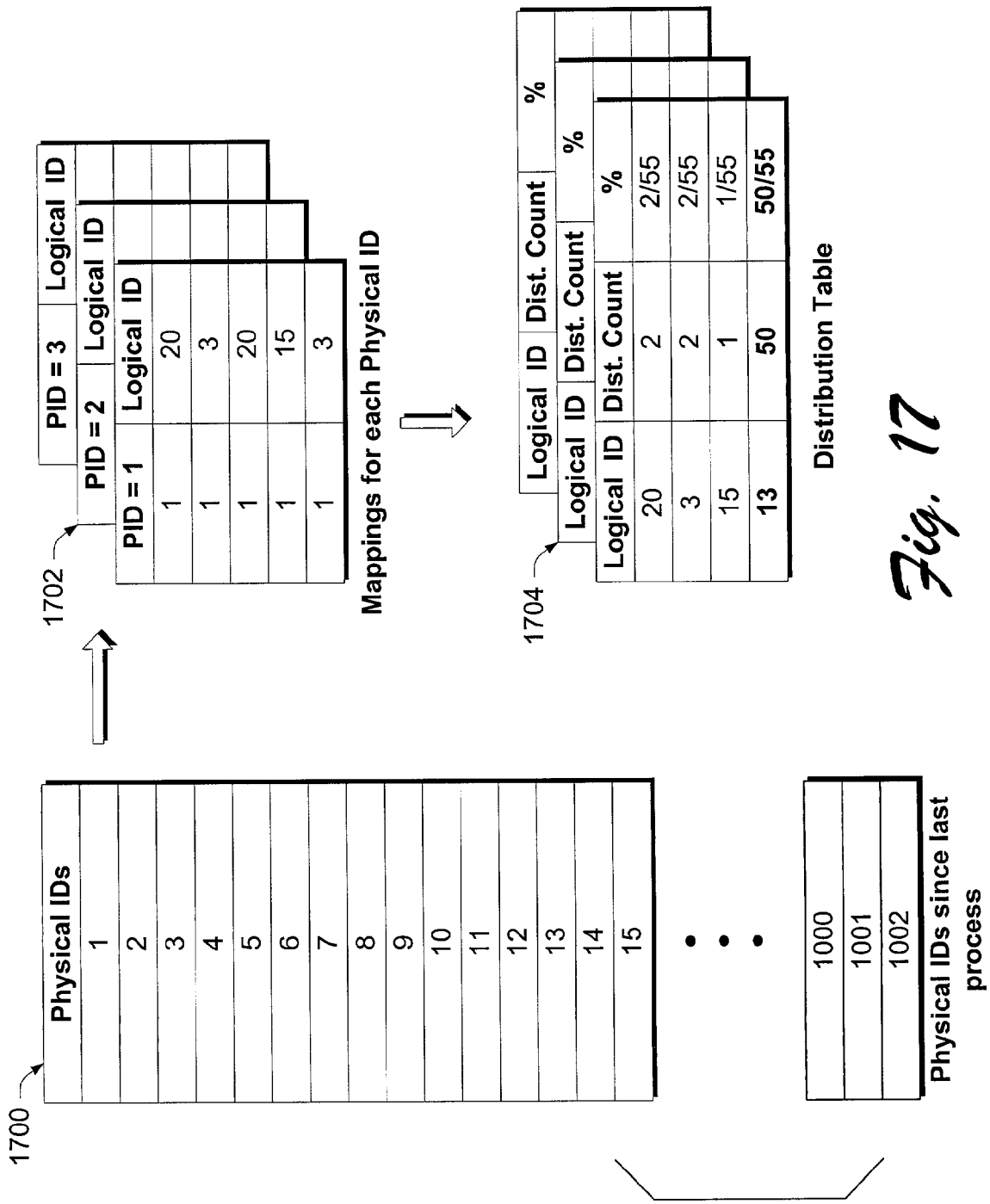
FIG. 17 is a block diagram that illustrates an exemplary process for ensuring the integrity of user-provided physical ID to logical ID mappings.

Step 1600 computes a list of physical IDs that have been entered since the system last ran a screening process on the user entries and which are to be statistically evaluated. This removes any duplicates that might appear in table 1500. The result of this computation is another table, such as the one shown at 1700 in FIG. 17. Once table 1700 is provided, step 1602 computes, for each physical ID appearing in table 1700, the total number of user feedback entries to date and the logical IDs that have been provided for each physical ID. Consider again FIG. 17 where table 1702 is shown. This table contains all of the user feedback entries for physical ID "1", as well as the corresponding logical IDs to which the physical IDs have been mapped. Notice that the physical ID of 1 has been mapped to various logical IDs that include 20, 3, and 15. These different mappings can be the result of user error, or can be an attempt by malicious individuals to provide erroneous mappings.

Next, step 1604 computes a distribution of user-entered logical IDs for the particular physical ID of interest. Consider again FIG. 17 and table 1704. There, a column designated "Logical ID" contains each logical ID for the particular physical ID of interest, and a column designated "Dist. Count" contains, for each logical ID, a value associated with the number of times its corresponding logical ID has been mapped to by a physical ID. So, for example, from table 1704, it appears that LID 20 was mapped to twice, as was LID 3. LID 15 was mapped to once. Table 1704 also contains a column designated "%", the purpose of which will become evident below.

Once the distribution has been calculated by step 1604, step 1606 adds a weighted entry to table 1704 based on the current canonical match for the logical ID that corresponds to the physical ID of interest. Specifically, in this example, assume that the physical ID undergoing processing (i.e. PID=1) has a mapping in the canonical table that corresponds to a logical ID of 13. Thus, an entry is made in table 1704 to contain the LID 13, as well as a weighted value that is selected in accordance with some definable criteria. In this example, assume that a weighted value of "50" is adequate.

From there, steps 1608 and 1610 compute the most likely physical ID to logical ID match using the data in table 1704. Any suitable algorithm can be used for computing the most likely match. In but one example, a standard majority algorithm is used. Specifically, in this example, the distribution count is totaled for a sum of 55. Now, step 1608 computes a percentage for each table entry (corresponding to the "%" column). Specifically, for LID 20, the percentage is ⅖₅; for LID 3 the percentage is ⅖₅; for LID 15 the percentage is ⅕₅; and for LID 13, the percentage is ⁵⁰⁄₅₅. Once the percentage is computed, step 1610 selects the LID for which the corresponding percentage meets predefined criteria. For example, for a particular logical ID to be selected, the predefined criteria might be that the percentage has to be greater than 0.50. Once the logical ID has been selected for a corresponding physical ID, step 1612 determines whether the selected logical ID is different from the logical ID that appears in the canonical table. If the logical ID is different, then step 1614 updates the canonical table with the logical ID that most likely matches the corresponding physical ID. If, on the other hand, the selected logical ID is the same as the logical ID that appears in the canonical table, step 1616 maintains the canonical table entry for the physical ID.

Step 1618 determines whether there are any additional physical IDs in table 1700 that need to be processed. If there are, the method branches back to step 1602. If there are not, the method ends at step 1620 until it is time to again process the user-provided physical ID to logical ID mappings.

CONCLUSION

The systems and methods described above can greatly enhance the user's media experience when they play a particular piece of media in an enabled player. A robust collection of metadata is available for provision to the user through the use of an organized mapping process that maps physical IDs associated with the user's media to logical IDs that are used for database queries. A data return mechanism and schema set provide a rich and extensible mechanism that facilitates data exchange between a client and a server. A user feedback system ensures that users can contribute to a set of understood physical ID to logical ID mappings, and that the contributions are immediately available for use by others. Management processes ensure that user contributions are understood, and that such contributions can be trusted.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable media having computer-readable instructions thereon which, when executed by a computer, cause the computer to:
   receive a physical ID that corresponds to a specific media upon which content resides that can be experienced by a user;
   attempt to map the physical ID to a logical ID by searching a first table containing physical ID-to-logical ID mappings using a first search, the first search comprising a low cost search;
   if the first search is unsuccessful, search a second table containing physical ID-to-logical ID mappings using a second search;
   if the second search is unsuccessful, search the first table using a third search, the third search comprising a higher cost search than the first search; and
   if a logical ID is found that corresponds to the physical ID, search a database that contains metadata associated with the specific media by using the logical ID as a basis for a search query, wherein different instances of a specific media with the same content thereon are associated with different physical IDs that are mappable to the same logical ID.

2. A method of processing media content comprising:
   providing a canonical table containing physical ID to logical ID mappings, the physical IDs being associated with specific media containing content that can be experienced by a user, the logical IDs being configured for use in database queries to locate metadata associated with specific media;
   providing a table containing user-provided physical ID to logical ID mappings;
   receiving a physical ID associated with a specific media;
   conducting a first low cost search of the canonical table to determine whether there is a matching physical ID with a corresponding logical ID;
   if the first low cost search is unsuccessful, conducing a second low cost search of the table containing the user-provided physical ID to logical ID mappings to determine whether there is a matching physical ID with a corresponding logical ID;
   if the second low cost search is unsuccessful, conducing a third higher cost search of the canonical table to determine whether there is a matching physical ID with a corresponding logical ID; and
   if any of the searches are successful, using the corresponding logical ID to search a database containing metadata associated with the specific media, wherein different instances of a specific media with the same content thereon are associated with different physical IDs that are mappable to the same logical ID.

3. The method of claim 2, wherein the specific media comprises CDs.

4. The method of claim 2, wherein the specific media comprises DVDs.

5. A method of providing metadata to a client comprising:
   establishing a table that contains user-provided entries that map physical IDs to logical IDs, the physical IDs corresponding to specific media upon which content resides that can be experienced by various users, the logical IDs being configured for use in querying one or more databases that contain metadata associated with the specific media, the metadata being returnable to a client;
   statistically evaluating the entries to determine, for each physical ID, a most likely logical ID match; and
   making the most likely logical ID match available so that it can be used to query the one or more databases.

6. The method of claim 5, wherein said making comprises providing the logical ID into a trusted table of physical ID-to-logical ID mappings.

7. A method of providing metadata to a client comprising:
   providing a table containing user-provided entries that map physical IDs to logical IDs, the physical IDs corresponding to specific media upon which content resides that can be experienced by various users, the logical IDs being configured for use in querying one or more databases that contain metadata associated with the specific media, the metadata being returnable to a client;

computing, from the table, a list of physical IDs that are to be statistically evaluated;

for each listed physical ID, ascertaining the logical IDs that have been associated with it by users;

computing a distribution of logical IDs for a given physical ID, the distribution describing, for each logical ID, the number of times the physical ID has been mapped thereto;

adding to the distribution, an entry that corresponds to a current trusted logical ID mapping;

weighting the added entry; and computing, from the distribution, a most likely physical ID to logical ID match.

8. The method of claim 7 further comprising updating a canonical table of trusted mappings with the most likely physical ID to logical ID match.

9. The method of claim 7, wherein said computing a most likely physical ID to logical ID match comprises:

computing a distribution count that sums the total number of times a physical ID has been mapped to a logical ID;

calculating, for each logical ID, a percentage as a function of the summed distribution count; and selecting a logical ID that has a percentage that meets predefined criteria.

* * * * *